United States Patent
Thoren et al.

(10) Patent No.: US 6,577,516 B1
(45) Date of Patent: Jun. 10, 2003

(54) METHOD AND APPARATUS FOR OPTIMIZING THE OUTPUT POWER OF A RECTIFIER

(75) Inventors: Christer Thoren, Hagersten (SE); Thomas Sahlstrom, Huddinge (SE)

(73) Assignee: Emerson Energy Systems AB, Stockholm (SE)

( * ) Notice: Subject to any disclaimer, the term of this patent is extended or adjusted under 35 U.S.C. 154(b) by 0 days.

(21) Appl. No.: 09/720,750
(22) PCT Filed: Jun. 28, 1999
(86) PCT No.: PCT/SE99/01159
    § 371 (c)(1),
    (2), (4) Date: Mar. 5, 2001
(87) PCT Pub. No.: WO00/02304
    PCT Pub. Date: Jan. 13, 2000

(30) Foreign Application Priority Data

Jul. 1, 1998 (SE) ............................. 9802355

(51) Int. Cl.⁷ ............................................. H02M 7/04
(52) U.S. Cl. ....................................................... 363/84
(58) Field of Search ............................ 363/84, 125, 78

(56) References Cited

U.S. PATENT DOCUMENTS

| 4,301,497 A | 11/1981 | Johari |
| 4,791,544 A | 12/1988 | Gautherin et al. |
| 4,964,029 A | * 10/1990 | Severinsky et al. ............ 363/80 |
| 5,132,606 A | * 7/1992 | Herbert ....................... 323/266 |
| 5,289,046 A | * 2/1994 | Gregorich et al. ............. 307/66 |
| 6,081,104 A | * 6/2000 | Kern ........................... 323/268 |

FOREIGN PATENT DOCUMENTS

EP    0 550 167 A2    7/1993

* cited by examiner

*Primary Examiner*—Adolf Deneke Berhane
(74) *Attorney, Agent, or Firm*—Harness, Dickey & Pierce, P.L.C.

(57) ABSTRACT

A rectifier comprising a preregulator (11; 21) and a DC/DC converter (13; 23) is disclosed, comprising means for controlling the output power $P_{OUT}$ from the DC/DC converter in dependence of the input power to the preregulator. A method of controlling such a rectifier by controlling the output power $P_{OUT}$ in dependence of the input current $I_{IN}$ is also disclosed. This ensures that the output power from the rectifier is never higher than what the preregulator can supply. As a result the rectifier according to the invention may be used at any power level and any input conditions. The output power $P_{OUT}$ may be controlled by controlling the output current $I_{OUT}$ from the DC/DC converter.

1 Claim, 3 Drawing Sheets

METHOD AND APPARATUS FOR OPTIMIZING THE OUTPUT POWER OF A RECTIFIER

TECHNICAL FIELD

The present invention relates to rectifiers, and in particular to a method and an apparatus for optimizing the output power of a rectifier comprising a preregulator and a DC/DC converter.

DESCRIPTION OF RELATED ART

In such rectifiers, the output power of the preregulator is the input power to the DC/DC converter. The input power to the preregulator is the power drawn from the mains. This input power P=U·I, I being the input current and U being the input voltage, is dependent of the actual load on the output. Typically, the input voltage U is dependent in the environment and the input current I is varied to compensate for this and to achieve the desired power. If the input voltage drops, the input current I is increased, but must, for electrical and thermal reasons, be kept below a maximum limit. This, a minimum voltage is required to ensure a certain power level.

To guarantee full operation at all specified conditions a nominal maximum output power is defined. This power is used as a limit regardless of the actual input voltage. For input voltages higher than the minimum, therefore, the preregulator will not deliver its theoretical maximum output power.

Even if the output power from the preregulator at a given time would be sufficient to sustain a higher output power from the DC/DC converter than the nominal maximum output power level, the output power is kept at the nominal maximum power level. The input power is matched with the output power to make sure that it is sufficient at the specified input conditions. The nominal maximum output is always the same even if the input conditions are better. Thus, the input stage is not used at its real maximum potential when the conditions are good, that is, when the input voltage is high.

It follows that the output power that could be obtained from the rectifier is in many cases higher than the nominal maximum output power. When the possible output power from the preregulator is below the required output power, the rectifier delivers no output power at all, even though it would be able to deliver a power level lower than the predefined power level. When the conditions are more favourable, the rectifier still only delivers the predefined power level even though a higher power level could be delivered.

Prior art rectifiers are known that function when the available output power from the preregulator is below the nominal output power. If, however, the output power from the DC/DC converter is too high to be maintained by the output power from the preregulator, these prior art rectifiers will cease to function in an uncontrolled way.

OBJECT OF THE INVENTION

It is an object of the present invention to enable an output power from a rectifier comprising a preregulator and a DC/DC converter, that is the maximum possible output power for the current conditions at any given time.

SUMMARY OF THE INVENTION

This object is achieved according to the present invention by a rectifier of the specified type, comprising means for controlling the output power $P_{OUT}$ from the DC/DC converter in dependence of the input power to the preregulator.

A method of controlling such a rectifier by controlling the output power $P_{OUT}$ in dependence of the input current $I_{IN}$ is also disclosed.

This solution ensures that the output power from the rectifiers is never higher than what the preregulator can supply. As a result the rectifier according to the invention may be used at any power level and any input conditions.

The output power $P_{OUT}$ may be controlled by controlling the output current $I_{OUT}$ from the DC/DC converter.

A status signal indicating if the input current $I_{IN}$ is at its maximum may be obtained in several different ways:

Based on the input current $I_{IN}$ to the preregulator. In this case, the rectifier comprises
- means for measuring the input current $I_{IN}$ to the preregulator;
- means for comparing the input current $I_{IN}$ to a maximum allowed input current to obtain the status signal.

Based on an input current reference value. In this case the rectifier comprises
- means for obtaining a reference value $I_{INREF}$ for the input current $I_{IN}$ for the current conditions;
- means for comparing said reference value to a reference value $I_{REF}$ to obtain said status signal.

Based on a control voltage for the output voltage $U_{INT}$ of the preregulator. In this case the rectifier comprises:
- means for measuring the output voltage $U_{INT}$ from the preregulator;
- means for generating a control voltage $U_{CTRL}$ by comparing the output voltage $U_{INT}$ to a reference voltage $U_{INTREF}$;
- comparing means for comparing said reference voltage $U_{CTRL}$ to a reference voltage $U_{REF1}$ to obtain said status signal.

Based on the output voltage $U_{INT}$ of the preregulator. In this case the rectifier comprises
- means for measuring the output voltage $U_{INT}$ from the preregulator;
- means for comparing said output voltage $U_{INT}$ to reference value $U_{REF2}$ to obtain said status signal.

Preferably, the status signal is processed before it is fed as a control signal to the DC/DC converter.

The processing may include
- filtering in a filter unit
- obtaining a difference signal between the filtered signal and an output current reference signal ($I_{OUTREF}$);
- comparing the difference signal to the output current $I_{OUT}$ from the DC/DC converter, the result of the comparison constituting the control signal to the DC/DC converter.

With the inventive solution the two feedback loops used in prior art solution are replaced by one. This enables a maximum output power for all operating conditions.

BRIEF DESCRIPTION OF THE DRAWINGS

The invention will be described in more detail in the following, with particular reference to the enclosed drawings, in which.

DETAILED DESCRIPTION OF EMBODIMENTS

Figure 1:
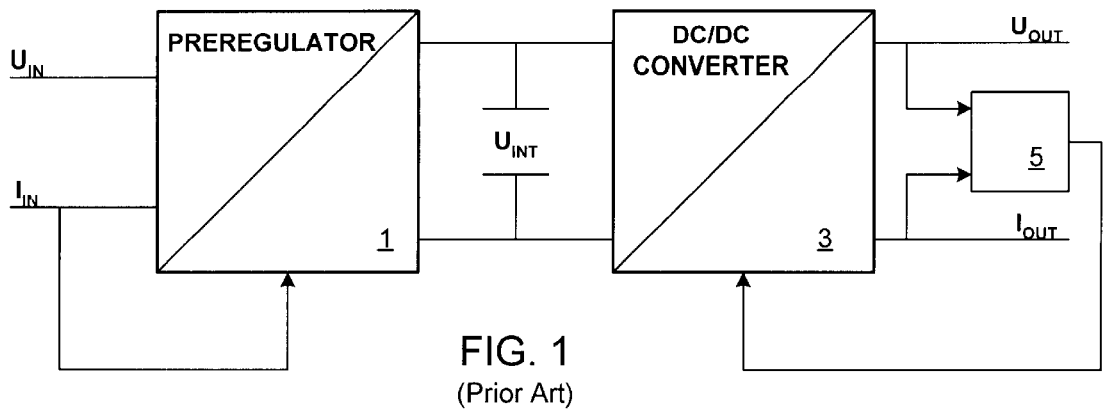
FIG. 1 shows a prior art rectifier.

FIG. 1 shows a prior art rectifier comprising a preregulator 1 and a DC/DC converter 3. The preregulator 1 is in this case an AC/DC converter. The preregulator has an input voltage denoted $U_{IN}$ and an input current denoted $I_{IN}$. The input power $P_{IN}=U_{IN} \cdot I_{IN}$. The output voltage from the preregulator, which is also the input voltage to the DC/DC converter, is denoted $U_{INT}$. The DC/DC converter has an output voltage denoted $U_{OUT}$ and an output current denoted $I_{OUT}$.

The output power $P_{OUT}$ from the DC/DC converter 3 is the output power from the rectifier, and is determined by $P_{OUT}=U_{OUT} \cdot I_{OUT}$. The output power from the DC/DC converter 3 should never be higher than the input power to the DC/DC converter 3, which is the output power from the preregulator 1. For electrical and thermal reasons the input current to the preregulator is limited to a maximum input current $I_{INMAX}$. This current $I_{INMAX}$ together with a specified minimum input voltage $U_{INMIN}$ will determine the available input power at the worst conditions. The DC/DC converter will be programmed to limit its output power to this value to ensure safe operation at all times. When the input voltage increases because of favourable conditions the input current decreases to keep the power constant.

In order to keep the output power from the preregulator 1 high enough, the output voltage is monitored, and when the output voltage $U_{INT}$ from the preregulator decreases, the input current $I_{IN}$ is increased. The input current $I_{IN}$ can only be allowed to rise to a certain value $I_{INMAX}$. If the input voltage $U_{IN}$ is too low, the input current $I_{IN}$ cannot be increased enough to secure the output power $P_{OUT}$. In the prior art rectifier shown in FIG. 1 a signal corresponding to the input voltage $U_{IN}$ is also fed to a control input of the preregulator 1. When the input voltage $U_{IN}$ goes below a predetermined threshold value, the rectifier 1 is shut off because the full power level cannot be guaranteed.

The output power from the DC/DC converter 3 in the prior art rectifier shown in FIG. 1 is calculated in a unit 5 based on the output voltage $U_{OUT}$ and the output current $I_{OUT}$. To control the output power of the rectifer, the output power is fed to a control input of the DC/DC converter 3 in a feedback connection and when the output power exceeds a predetermined value, it is reduced. This is normally done by reducing the output current of the DC/DC converter 3.

Figure 2:
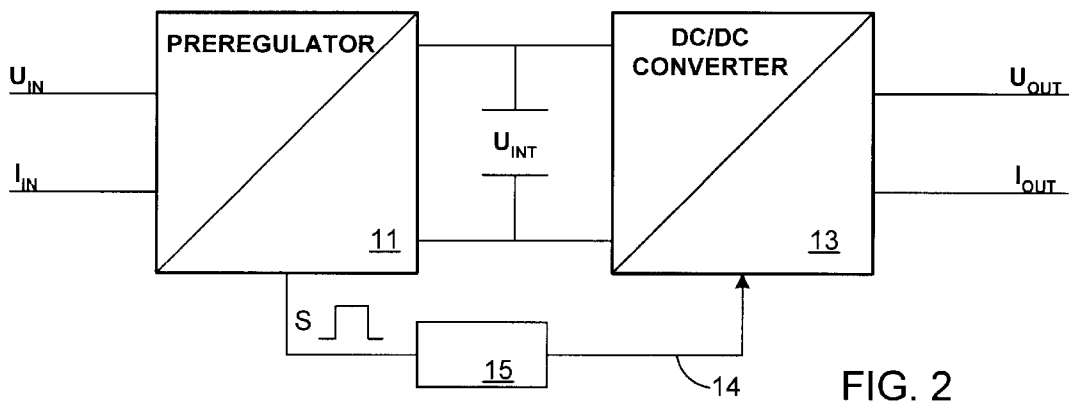
FIG. 2 shows a rectifier according to a first embodiment of the invention.

FIG. 2 shows a rectifier according to a first embodiment of the present invention. As in FIG. 1, the rectifier comprises a preregulator 11 and a DC/DC converter 13, the output voltage $U_{INT}$ from the preregulator 11 constituting the input voltage of the DC/DC converter 13. The preregulator 11 has an input voltage $U_{IN}$ and an input current $I_{IN}$, which are the input voltage and the input current to the rectifier. The DC/DC converter has an output voltage $U_{OUT}$ and an output current $I_{OUT}$, which are the output voltage and the output current from the rectifier.

As in prior art rectifiers, the input current $I_{IN}$ and the input voltage $U_{IN}$ determines the output power $P_{OUT}$ that can be delivered. To ensure that the output power $P_{OUT}$ of the DC/DC converter 13 never rises above what can be sustained by the preregulator 11 at any given time, a status signal S transmitted on a feed forward connection 14 to the DC/DC converter indicates whether or not the output power has reached its limit for the present conditions. The status signal S is a digital signal that is high when the output power $P_{OUT}$ is higher than the input power $P_{IN}$ and low when it is not (or vice versa), and is used to control the output power $P_{OUT}$ of the DC/DC converter 13 so that it does not at any time exceed the input power supplied from the preregulator 11. A processing unit 15 is used to process the status signal S before it is sent to the control input of the DC/DC converter 13.

Figure 3:
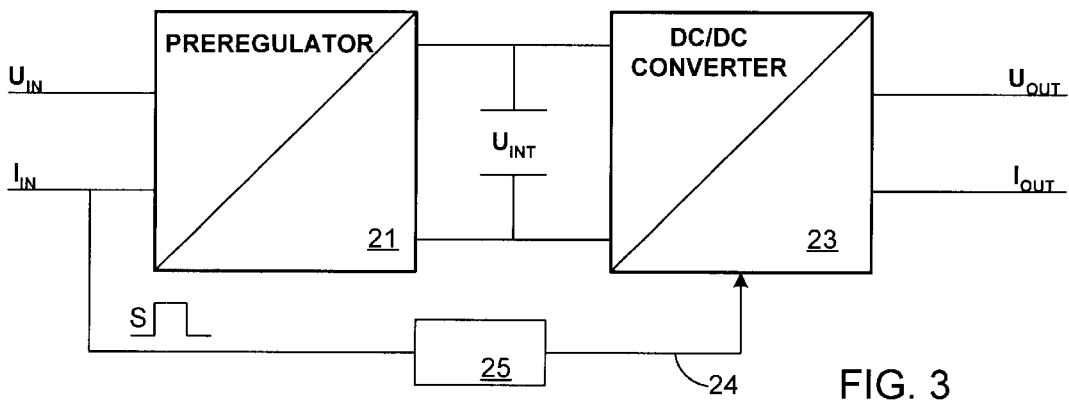
FIG. 3 shows a rectifier according to a second embodiment of the invention.

FIG. 3 shows a rectifier according to a second embodiment of the present invention. As in FIG. 2, the rectifier comprises a preregulator 21 and a DC/DC converter 23, the output voltage $U_{INT}$ from the preregulator 21 constituting the input voltage of the DC/DC converter 23. The preregulator 21 has an input voltage $U_{IN}$ and an input current $I_{IN}$, which are the input voltage and the input current to the rectifier. The DC/DC converter has an output voltage $U_{OUT}$ and an output current $I_{OUT}$, which are the output voltage and the output current from the rectifier.

As in FIG. 2, a status signal S is fed forward to the DC/DC converter in a feed forward connection 24, to ensure that the output power $P_{OUT}$ of the DC/DC converter 23 never rises above what can be sustained by the preregulator 21 at any given time. FIG. 3 the status signal S is obtained by measuring the input current $I_{IN}$ and processing it in a processing unit 25.

Figure 4A:
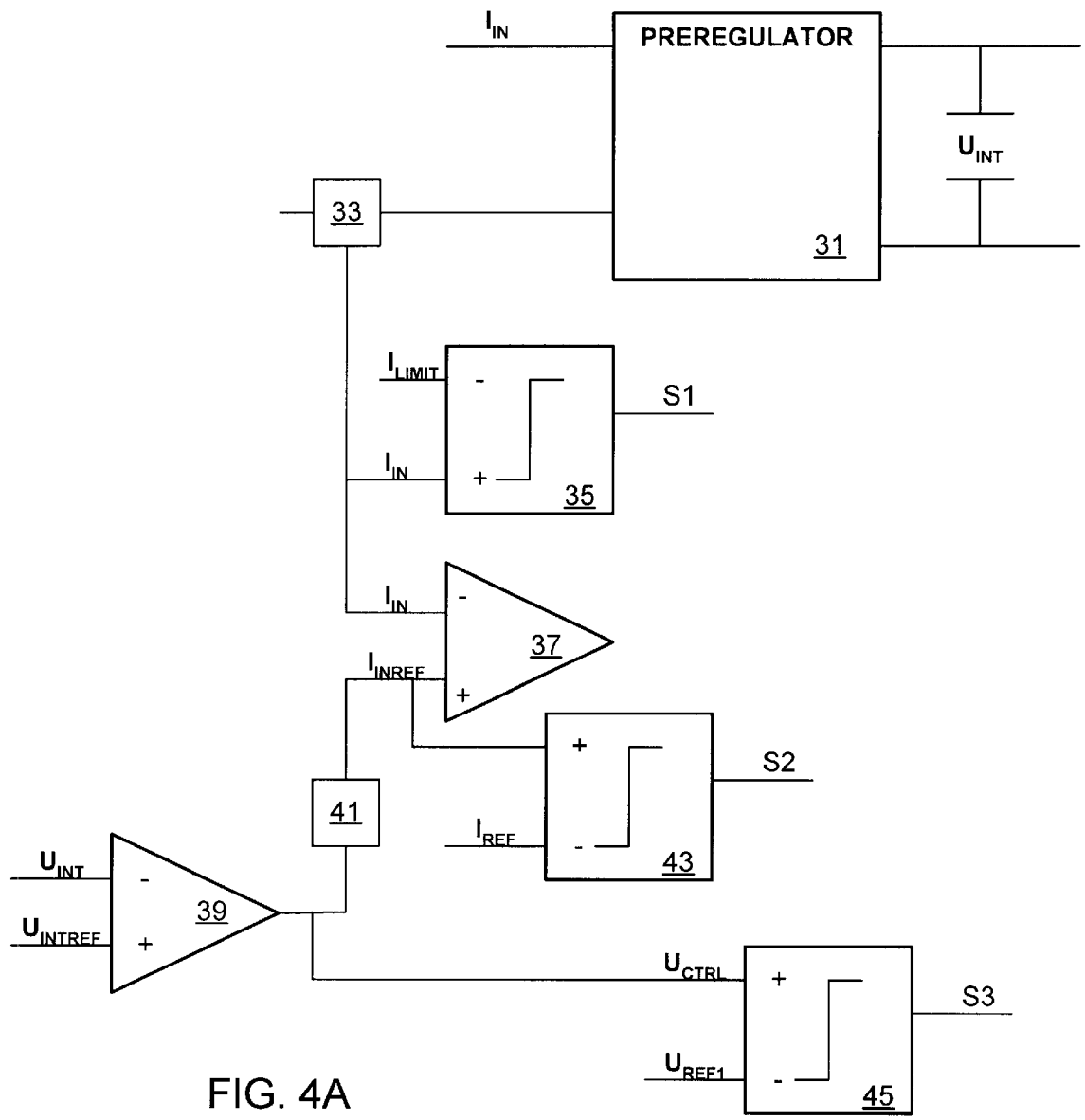
FIGS. 4A and 4B show different ways of obtaining the status signal.
Figure 4B:
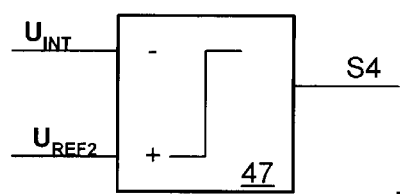

With reference to FIGS. 4A and 4B, four different ways of obtaining the status signal S will be discussed in more detail.

In FIG. 4A a preregulator 31 similar to the preregulator of the rectifier shown in FIGS. 2 and 3 is shown. The input current $I_{IN}$ to the preregulator 31 is measured in a current measuring unit 33. The output from the current measuring unit 33 is fed to the inverting input of a first error amplifier 37. On the non-inverting input to the first error amplifier 37 the output of a second error amplifier 39 is applied, usually with one or more electronic components 41 therebetween. On the inverting input of the second error amplifier 39 the output voltage $U_{INT}$ from the preregulator is applied. On the non-inverting input of the second error amplifier 39 a reference voltage $U_{INTREF}$ for the output voltage $U_{INT}$ is applied. The input signal to the non-inverting input of the first error amplifier 37 therefore is a reference signal $I_{INREF}$ indicating a reference value for the input current $I_{IN}$. The output of the first error amplifier 37 is used to control the preregulator 31, in ways that are not relevant to the invention and will not be discussed in more detail in this document. The output of the second error amplifier 39 constitutes a control voltage $U_{CTRL}$, the use of which will be discussed below.

As mentioned above, the input current $I_{IN}$ to the preregulator 31 is used to compensate for variations in the input voltage $U_{IN}$. Therefore, if the input current becomes very high, it means that the output power of the DC/DC converter is greater than what the preregulator can supply under the present conditions. This is used in the first way of obtaining the status signal S, shown in FIG. 4A.

In the first way shown in FIG. 4A of obtaining the status signal S, the output signal from the current measuring unit 33 and compared in a first comparator 35 to a reference value $I_{LIMIT}$ of the input current. The result of the comparison, that is, the output signal from the first comparator 35 is a signal S1, which in one embodiment is used as the status signal S.

In a second way of obtaining the status signal S, the current reference signal $I_{INREF}$ is used as an indication of the input current $I_{IN}$. The reference signal $I_{INREF}$ is input to one input terminal of a second comparator 43. On the second input terminal of the second comparator 43 a reference signal $I_{REF}$ is applied. The result of the comparison, that is, the output signal from the second comparator 43 is a signal S2, which in one embodiment is used as the status signal S.

A third way of obtaining the status signal S utilizes the fact that the output voltage control circuit will try to increase the output voltage $U_{OUT}$ by increasing the output current $I_{IN}$. This can only be done to a certain limit $I_{INMAX}$ because, as explained above, the input current is limited. The control voltage $U_{CTRL}$ from the second 39 error amplifier will therefore reach a high level outside the normal regulation band. This voltage is fed to a third comparator 45 and compared to a reference signal $U_{REF1}$. The result of the comparison, that is, the output signal from the third comparator 45 is a signal S3, which in one embodiment is used as the status signal S.

FIG. 4B shows a fourth way of obtaining the status signal S. The output voltage $U_{INT}$ from the preregulator 31 (not shown in FIG. 4B) is applied to one terminal of a fourth comparator 47 and compared to a reference voltage signal $U_{REF2}$. The result of the comparison, that is, the output signal from the fourth comparator 47 is a signal S4, which in one embodiment is used as the status signal S. Effectively, when the voltage controller output is at its maximum, this indicates that the output voltage $U_{INT}$ from the preregulator is constantly too low for the current output power. Therefore, the output power should be reduced.

If the status signal S is obtained according to the third or fourth way described above, the maximum input current $I_{IN}$ must be limited.

When the input current $I_{IN}$ becomes to high, the output power $P_{OUT}$ has to be reduced. According to a preferred embodiment this is achieved by reducing the output current $I_{OUT}$ from the DC/DC converter. When the output power $P_{OUT}$ is reduced, the input power to the DC/DC converter is automatically reduced. Then, the output power from the preregulator is reduced and the input current $I_{IN}$ is reduced. When the input current $I_{IN}$ has dropped so that $I_{IN}<I_{LIMIT}$, the output power does not have to be further reduced.

Figure 5A:
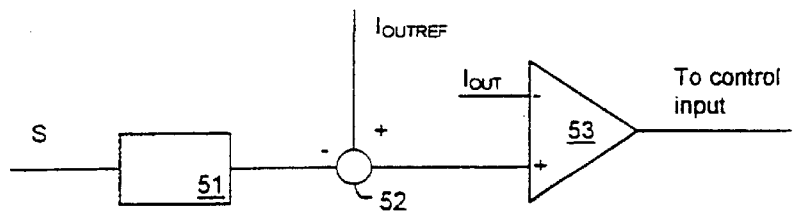
FIG. 5A shows a general control connection according to a preferred embodiment of the invention.

FIG. 5A shows the elements of the feed forward connection shown in FIG. 3 according to a preferred embodiment of the invention. The status signal S is filtered in a filter unit 51, and the resulting signal is subtracted, in a subtracting unit 52 from a reference signal $I_{OUTREF}$ indicating what the output current should be for the present conditions. The resulting signal is applied to the non-inverting input of an error amplifier 53. On the inverting input of the error amplifier 53 the output current $I_{OUT}$ from the rectifier (not shown) is applied. The output signal from the comparing unit is applied to the control input of the DC/DC converter, for example, the DC/DC converter 13 of FIG. 2.

Therefore, assuming that the status signal S is high, the output from the filter 51 increases. The output from the subtraction unit 52 will become lower than the output current $I_{OUT}$ and output of the control unit will fall. Therefore, the signal fed to the control input of the DC/DC converter will indicate that the output power should be lowered.

Figure 5B:
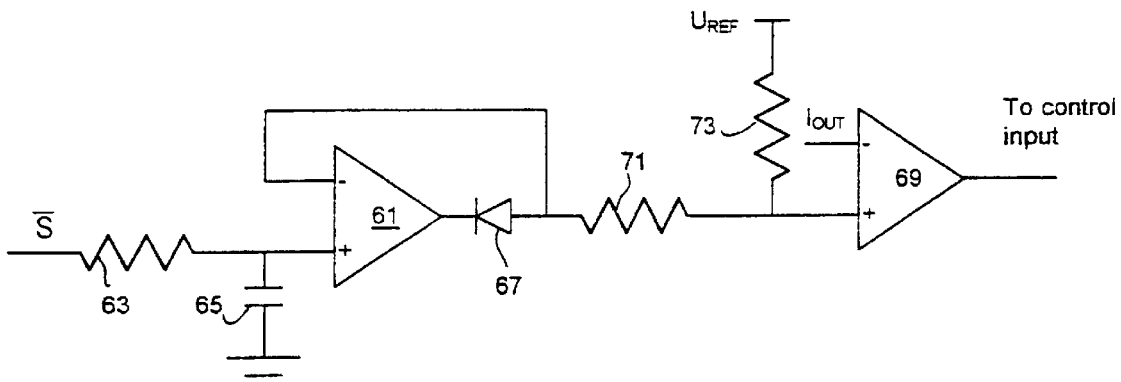
FIG. 5B shows a more specific embodiment of the control connection.

FIG. 5B shows an embodiment of the feed forward connection shown in FIG. 5A. The inverse status signal $\overline{S}$ to the preregulator is fed to the non-inverting input of a first error amplifier 61 through a first resistor 63. A capacitor 65 is connected between the non-inverting input of the first comparing means 61 and ground. Thus, the resistor 63 and the capacitor 65 constitute an RC connection functioning as the filter 51 in FIG. 5A. The output signal from the comparing unit 61 is fed back to the inverting input of the comparing unit 61 through a diode 67 and, through a second resistor 71, to the non-inverting input a second error amplifier 69.

The second resistor 71 and a third resistor 73 connected between the non-inverting input of the second error amplifier 69 and a reference voltage $U_{REF}$, function as a voltage divider. On the inverting input of the second error amplifier 69 the output current $I_{OUT}$ from the DC/DC converter (not shown) is applied.

If the status signal S is high, the inverse status signal $\overline{S}$ is low. The input to the first error amplifier 61, filtered through the RC connection, will then decrease. The output signal from the first error amplifier 61 decreases. Consequently, the input to the second error amplifier 69 will become lower than $I_{OUT}$. Thus the output signal from the second error amplifier 69 decreases and the control signal to the DC/DC converter will indicate that the output power of the DC/DC converter should be reduced.

The input voltage to the non-inverting input of the second error amplifier 69 is proportional to, and may be used as an indication of the maximum allowed output current $I_{OUT}$ from the rectifier at any given time. To the inverting input of the second error amplifier 69 the output current $I_{OUT}$ from the rectifier is connected. Thus, the second error amplifier 69 compares the defined maximum allowed output current to the actual output current $I_{OUT}$. The result of the comparison is fed to the control input of the DC/DC converter.

Figure 6A:
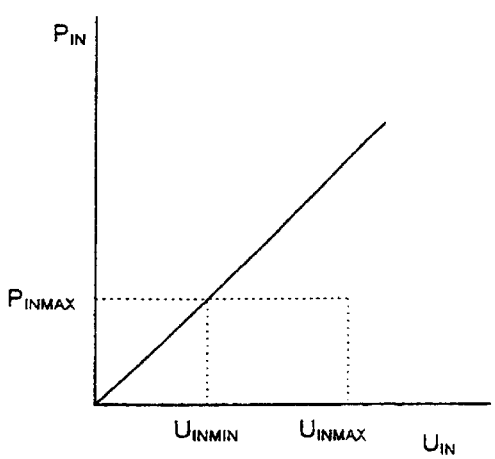
FIGS. 6A and 6B illustrate the function of a rectifier according to the invention compared to a prior art rectifier.
Figure 6B:
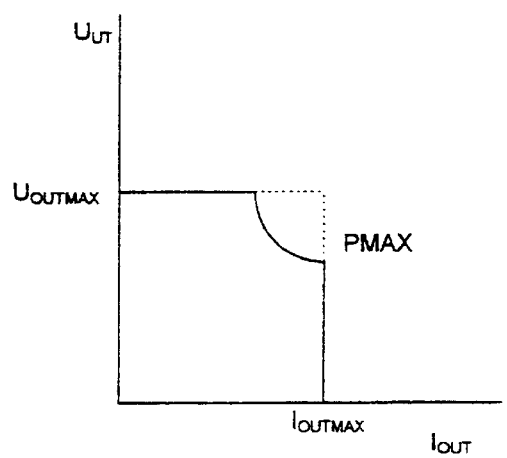

FIGS. 6A and 6B illustrate the function of a rectifier according to the invention compared to a prior art rectifier.

In FIG. 6A, the input power to the preregulator is shown as a linear function of the input voltage $U_{IN}$. The slope of the curve corresponds to the maximum input current $I_{INMAX}$. Along the $P_{IN}$ axis a point $P_{INMAX}$ indicates the highest possible input power at the minimum input voltage.

In a prior art rectifier, this is the input power required to reach the highest output power $P_{OUT}$ allowed from the rectifier. This point $P_{INMAX}$ corresponds to a specified minimum input voltage $U_{INMIN}$, which is the lowest input voltage to the rectifier for which this output power can be sustained. If the input voltage $U_{IN}$ drops below this lowest input voltage $U_{INMIN}$, the rectifier ceases to function because the input power $P_{IN}$ cannot be kept at the desired level. Prior art rectifiers, therefore, are usually turned off when the input voltage $U_{IN}$ drops below the specified minimum input voltage $U_{INMIN}$.

For a rectifier according to the invention the nominal minimum voltage is not needed. The rectifier can function for all voltages without the risk of the output power $P_{OUT}$ becoming higher than what can be supplied. Also, the output power can be allowed to increase with increasing input voltage $U_{IN}$.

FIG. 6B shows the output voltage $U_{OUT}$ as a function of the output current $I_{OUT}$. For a prior art rectifier the output voltage is constant up to a certain value of the output current $I_{OUT}$, at which it starts to decrease. Up to the maximum level $I_{OUTMAX}$ of the output current, the voltage $U_{OUT}$ then decreases in such a way that the output power $P_{OUT}=U_{OUT} \cdot I_{OUT}$ is constant. In this way, the output power $P_{OUT}$ never rises above its maximum value. For increased loads the current is kept constant and the voltage continues to drop.

For rectifiers according to the present invention the output power does not have to be limited. Therefore, the whole area defined by $U_{OUTMAX}$ and $I_{OUTMAX}$ may be used, depending on the power available form the preregulator, which in turn depends on the input voltage. As can be seen, this makes it possible to reach the highest possible output power when the conditions will allow it.

What is claimed is:

1. A rectifier having a preregulator having an AC input and a DC output and a DC/DC converter, the rectifier comprising means for using a status signal to control the output power from the DC/DC converter in dependence of the input power that can be handled by the preregulator at any given time;

said rectifier comprising a processing unit for processing the status signal before feeding it as a control signal to the DC/DC converter;

said processing unit comprising:
   a filter unit for filtering the status signal;
   a subtraction unit for obtaining a difference signal between the filtered signal and an output current reference signal;
   an error amplifier for comparing the difference signal to the output current from the DC/DC converter, the result of the comparison constituting the control signal to the DC/DC converter.

* * * * *